US012757013B2

(12) United States Patent
Wong

(10) Patent No.: US 12,757,013 B2
(45) Date of Patent: Oct. 6, 2026

(54) APPARATUSES AND COMMUNICATION METHODS OF KEY GENERATION

(71) Applicant: INNOPEAK TECHNOLOGY, INC., Palo Alto, CA (US)

(72) Inventor: Marcus Wong, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 168 days.

(21) Appl. No.: 18/758,208

(22) Filed: Jun. 28, 2024

(65) Prior Publication Data

US 2025/0008322 A1 Jan. 2, 2025

Related U.S. Application Data

(60) Provisional application No. 63/524,473, filed on Jun. 30, 2023.

(51) Int. Cl.
*H04W 12/041* (2021.01)

(52) U.S. Cl.
CPC .................................. *H04W 12/041* (2021.01)

(58) Field of Classification Search
CPC .................................................... H04W 12/041
See application file for complete search history.

(56) References Cited

U.S. PATENT DOCUMENTS

| | | | | |
|---|---|---|---|---|
| 10,341,102 | B2 * | 7/2019 | Bowman | H04L 9/14 |
| 11,824,275 | B2 * | 11/2023 | Tran | H04B 17/318 |
| 12,146,936 | B2 * | 11/2024 | Luo | G01S 5/02 |
| 12,519,507 | B2 * | 1/2026 | Duan | H04B 7/04013 |
| 2018/0069699 | A1 * | 3/2018 | Bowman | H04L 9/002 |
| 2020/0358184 | A1 * | 11/2020 | Tran | H04B 17/318 |
| 2023/0353982 | A1 * | 11/2023 | Routt | H04W 4/029 |
| 2024/0056129 | A1 * | 2/2024 | Duan | H04B 7/04013 |
| 2024/0313828 | A1 * | 9/2024 | Elshafie | H04L 9/0875 |
| 2024/0356625 | A1 * | 10/2024 | Walker | H04B 7/15528 |
| 2025/0093487 | A1 * | 3/2025 | Walker | G01S 13/003 |
| 2025/0113165 | A1 * | 4/2025 | Routt | G06N 3/098 |
| 2025/0168626 | A1 * | 5/2025 | Zhang | H04W 12/03 |

* cited by examiner

*Primary Examiner* — Sharon S Lynch
(74) *Attorney, Agent, or Firm* — BAYES PLLC

(57) ABSTRACT

A wireless communication method of key generation by a user equipment includes obtaining sensor data from a sensor coupled to a target object, performing a key generation with a base station, obtaining cryptographic information based on the key generation, receiving a reflected-sensing signal from the target object, encrypting at least one of the sensor data and the reflected-sensing signal using the cryptographic information to generate an encrypted packet, and transmitting the encrypted packet to the base station.

8 Claims, 5 Drawing Sheets

APPARATUSES AND COMMUNICATION METHODS OF KEY GENERATION

CROSS-REFERENCE TO RELATED APPLICATION

This application claims the benefit of priority to U.S. Provisional Application No. 63/524,473, entitled "METHOD FOR SECURE AND EFFICIENT SENSING IN A COMMUNICATION SYSTEM," filed on Jun. 30, 2023, which is hereby incorporated in its entirety by this reference.

TECHNICAL FIELD

The present disclosure relates to the field of communication systems, and more particularly, to apparatuses and wireless communication methods of key generation such as a user equipment, a base station, and wireless communication methods for secure and efficient sensing in a communication system.

BACKGROUND

Some drawbacks are present in existing location or location services. Existing location or positioning services may not be suitable for sensor data transmission because the amount of sensor data is expected to be large. Security mechanisms designed for small data transmission for user equipments (UEs) that are not in connected mode may not be suitable for sensor data transmission. Further, the sensor data collected by sensors may be only sent to a network using dedicated signaling or message exchanges by the UE.

Therefore, there is a need for apparatuses and wireless communication methods of key generation such as a user equipment, a base station, and wireless communication methods for secure and efficient sensing in a communication system.

SUMMARY

An object of the present disclosure is to propose apparatuses and wireless communication methods of key generation such as a user equipment, a base station, and wireless communication methods for secure and efficient sensing in a communication system, which can provide secure and efficient sensing.

In a first aspect of the present disclosure, a wireless communication method of key generation by a user equipment, includes obtaining sensor data from a sensor coupled to a target object, performing a key generation with a base station, obtaining cryptographic information based on the key generation, receiving a reflected-sensing signal from the target object, encrypting at least one of the sensor data and the reflected-sensing signal using the cryptographic information to generate an encrypted packet, and transmitting the encrypted packet to the base station.

In a second aspect of the present disclosure, a wireless communication method of key generation by a base station, includes performing a key generation with a user equipment; obtaining cryptographic information based on the key generation, transmitting a sensing signal to a target object associated with a sensor, and receiving an encrypted packet from a user equipment, wherein the encrypted packet includes at least one of sensor data and a reflected-sensing signal.

In a third aspect of the present disclosure, a user equipment includes an executor and a transceiver. The executor is configured to obtain sensor data from a sensor coupled to a target object, perform a key generation with a base station, and obtain cryptographic information based on the key generation. The transceiver is configured to receive a reflected-sensing signal from the target object, the executor is configured to encrypt at least one of the sensor data and the reflected-sensing signal using the cryptographic information to generate an encrypted packet, and the transceiver is configured to transmit the encrypted packet to the base station.

In a fourth aspect of the present disclosure, a user equipment includes a memory, a transceiver, and a processor coupled to the memory and the transceiver. The user equipment is configured to perform the above method.

In a fifth aspect of the present disclosure, a base station includes an executor and a transceiver. The executor is configured to perform a key generation with a user equipment and obtain cryptographic information based on the key generation. The transceiver is configured to transmit a sensing signal to a target object associated with a sensor and receive an encrypted packet from a user equipment, wherein the encrypted packet includes at least one of sensor data and a reflected-sensing signal.

In a sixth aspect of the present disclosure, a base station includes a memory, a transceiver, and a processor coupled to the memory and the transceiver. The base station is configured to perform the above method.

In a seventh aspect of the present disclosure, a non-transitory machine-readable storage medium has stored thereon instructions that, when executed by a computer, cause the computer to perform the above method.

In an eighth aspect of the present disclosure, a chip includes a processor, configured to call and run a computer program stored in a memory, to cause a device in which the chip is installed to execute the above method.

In a ninth aspect of the present disclosure, a computer readable storage medium, in which a computer program is stored, causes a computer to execute the above method.

In a tenth aspect of the present disclosure, a computer program product includes a computer program, and the computer program causes a computer to execute the above method.

In an eleventh aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Figure 1:
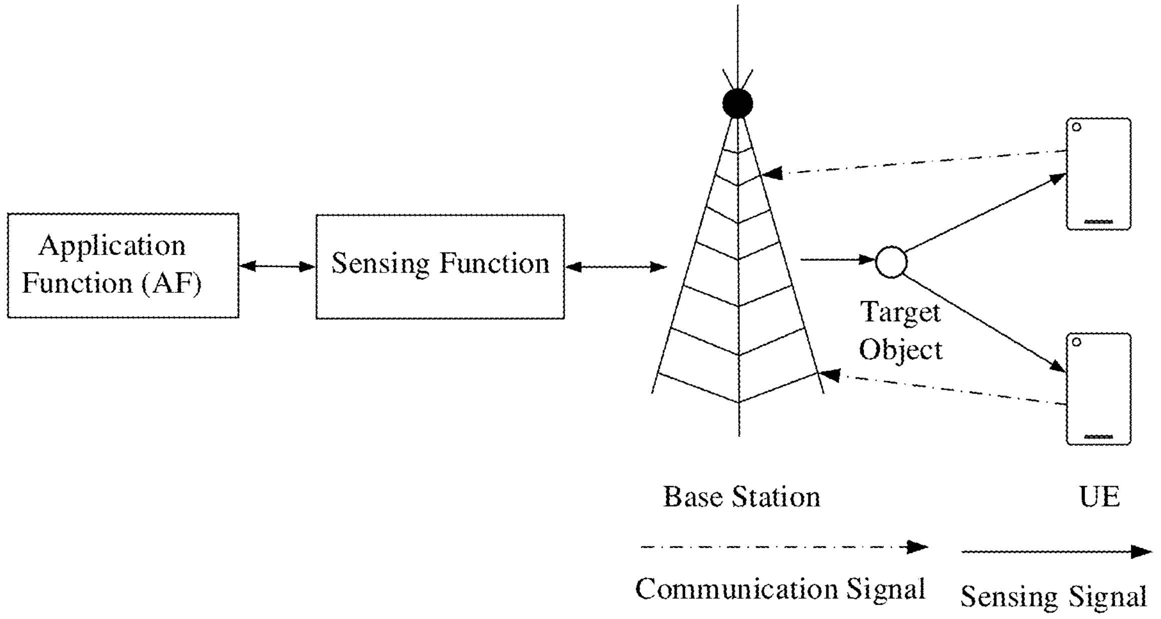
FIG. 1 is a block diagram of an example of sensing architecture in fifth generation (5G).

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

The technical solutions of the embodiments of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD) system, an advanced long term evolution (LTE-A) system, a future 5th generation (5G) system (may also be called a new radio (NR) system), an evolution system of a NR system, a LTE-based access to unlicensed spectrum (LTE-U) system, a NR-based access to unlicensed spectrum (NR-U) system, an universal mobile telecommunication system (UMTS), a global interoperability for microwave access (WiMAX) communication system, wireless local area networks (WLAN), wireless fidelity (Wi-Fi), or other communication systems, etc.

Optionally, a user equipment (UE) mentioned in the embodiments of the present application may refer to an access terminal, a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a future 5G network, a terminal device in a future evolved public land mobile network (PLMN), etc.

Optionally, the communication system in the embodiment of the present application may be applied to an unlicensed spectrum, where the unlicensed spectrum may also be considered as a shared spectrum, or the communication system in the embodiment of the present application may also be applied to a licensed spectrum, where the licensed spectrum can also be considered an unshared spectrum.

Using 5G signal for sensing is a relatively new technology. Existing techniques typically use dedicated sensors, e.g., such as a motion sensor, a proximity sensor, a gyroscope, an accelerometer, etc., for sensing. These sensors can be used individually or in combination to achieve a desired sensing result. The sensing result may include, e.g., detecting a target object moving toward another object, or the speed and direction at which a target object is moving.

Prior technology using 5G signal for sensing is limited. In positioning services, e.g., it is used to find the location of a target object (e.g., a user equipment (UE)). Note that in both of the above cases, the target object is associated with a UE or is the UE. 5G signals are protected only when a transmitter (e.g., UE) and a receiver (e.g., base station such as gNB) have established a security association by performing mutual authentication between a UE and a base station at layers higher than a medium access control (MAC) layer or a physical (PHY) layer. Only after authentication and security establishment can the communication between the transmitter and the receiver be secured. Lower layer signals (e.g., MAC layer or PHY layer signals) are not protected prior to security association establishment.

A typical sensing deployment scenario may include additional non-3rd generation partnership project (3GPP) sensors. Non-3GPP sensors may include, e.g., sensors attached to a patient used to measure blood pressure, heart rate, etc. Sensors are used to supplement and to increase the accuracy of the sensing results. Sensing results are derived from the raw sensor data received from the UE. The non-3GPP sensors (e.g., one that does not use licensed 5G spectrum) can be wirelessly attached to a UE via non-3GPP defined air interface such as Bluetooth, institute of electrical and electronic engineers (IEEE) 802.11 or other technology (e.g., non-3GPP technology). The UE is then able to collect the information generated by the sensors that are attached to a target object being sensed. However, dedicated signaling or messages are needed for sending the UE collected information to a network for sensing purposes.

Non-3GPP sensors attached to sensed target-object can also be connected wirelessly or wired to a 3GPP base station (e.g., using non-3GPP access technology), a 3GPP home gateway, and/or a 3GPP consumer premises equipment (CPE). The sensing result can be sent to a network via a 3GPP base station, a 3GPP home gateway, or a 3GPP CPE using dedicated signaling or message exchange.

Some drawbacks are present in existing location or location services. One drawback of existing location or positioning services is that, e.g., security is typically only established at higher layers (e.g., radio resource control (RRC) and/or packet data convergence protocol (PDCP) layers) than where sensing-signal exchange takes place (e.g., MAC layer or PHY layer). When security is established at a higher layer, it requires a UE to be actively in a connected mode (e.g., RRC_CONNECTED). In instances in which the UE is not in connected mode (e.g., RRC_IDLE or RRC_INACTIVE), the protection of lower layer (e.g., MAC layer or PHY layer) relies on small-data transmission (SDT), where security is maintained at higher layer and small amount of data is sent to a network without waking up a UE (e.g., transitioning a UE from either RRC_IDLE or RRC_INACTIVE to RRC_CONNECTED). The amount of sensor data is expected to be large. Therefore, security mechanisms designed for small data transmission for UEs that are not in connected mode may not be suitable for sensor data transmission.

Another drawback is that the sensing signal exchange may be only dedicated for the purpose of performing sensing operations. If there are additional external non-3GPP sensors (e.g., motion sensor, temperature sensor, etc.) already attached to the sensing target object, sensor data from these sensors would need to be separately transported in dedicated messages by an end point (e.g., a UE that collects the sensor data from the sensors) or by the sensors directly. Since these sensors are not defined by 3GPP, they cannot use 3GPP access technology signaling (e.g., 4G or 5G along with the licensed spectrum) to transport sensor data to a 3GPP network. In either case, the sensor data collected by sensors can only be sent to the network using dedicated signaling or message exchanges by the UE or by the equipment (attached to the sensor wirelessly or wired).

5G sensing service is being developed to support a variety of use cases such as smart city (e.g., road obstacle detection, pedestrian detection), smart homes (e.g., intrusion detection), smart health (e.g., patient vital statistics monitoring), extended reality (XR) (e.g., player movement, gesture recognition), etc. FIG. 1 is a block diagram of an example of sensing architecture in fifth generation (5G). FIG. 1 illustrates that, in some embodiments, 5G sensing uses 5G radio waves (or signals) transmitted to a target object and then reflected to a receiver similar to that of a light detection and ranging (LiDAR) or a radar. An external application function (AF) entity then can use the received signal or sensor data directly or indirectly (via processing by a sensing function) to acquire physical, biological, or some other characteristics information of the target object.

FIG. 1 illustrates that, in some embodiments, the main difference (and advantage) of 5G sensing is that the 5G radio-wave transmitters are abundantly available through the use of deployed 5G base stations and 5G user equipments (UEs) and that the radio waves are transmitted using licensed 5G spectrum when compared to traditional sensing where dedicated sensors need to be attached or placed near the target object or target environment. The reflected signals (also known as sensing measurement data) received by the receiver are then sent to the 5G system for collection and processing. The processed information is sensing result and is used as input for carrying out additional activities (e.g., sending out warning when pedestrian is detected on the roadway) as directed by an application server or AF entity. The signals for sensing between a transmitter and a receiver can be sent in lower layer (e.g., medium access control (MAC) layer or physical (PHY) layer) messages that do not carry certain types of sensitive data (e.g., user privacy sensitive data or other higher layer data) and may not protected by 5G security, in some scenarios.

Some embodiments of the present disclosure provide a mechanism that enables secure transmission and reception of sensing signals. Additionally, some embodiments of the present disclosure allow additional sensor data to be carried in the sensing signal exchanges between transmitter and receiver to reduce the need for additional round-trip signaling exchanges.

Radio waves carrying the necessary sensing signals for use in sensing may be from lower layers, e.g., such as the MAC layer or the PHY layer, and may be not security protected before a transmitter (e.g., base station such as gNB) and a receiver (e.g., UE) establish security association. Additionally, the signaling exchange between the transmitter and receiver may not carry information other than the information necessary for the transmitter and the receiver to synchronize and establish connection.

A sensing deployment scenario may include additional non-3GPP sensors. For example, these non-3GPP sensors may be attached to a target object such as a patient that is used to measure blood pressure, heart rate, etc. The non-3GPP sensors can be wirelessly attached to a UE via non-3GPP defined air interface such as Bluetooth, IEEE 802.11 or other technology. The UE is then able to collect the information generated by the sensors to which it is associated and/or attached.

Some embodiments of the present disclosure may achieve at least one of the followings: 1. PHY layer key generation to generate encryption keys between a UE and a base station. 2. Combining a sensing signal received from the UE and sensor data obtained/collected by the UE. 3. Ciphering the combined sensing signal and sensor data. 4. The ciphered sensor data is sent from the UE to the base station without additional signaling for sending the sensor data in separate message exchange.

Figure 2:
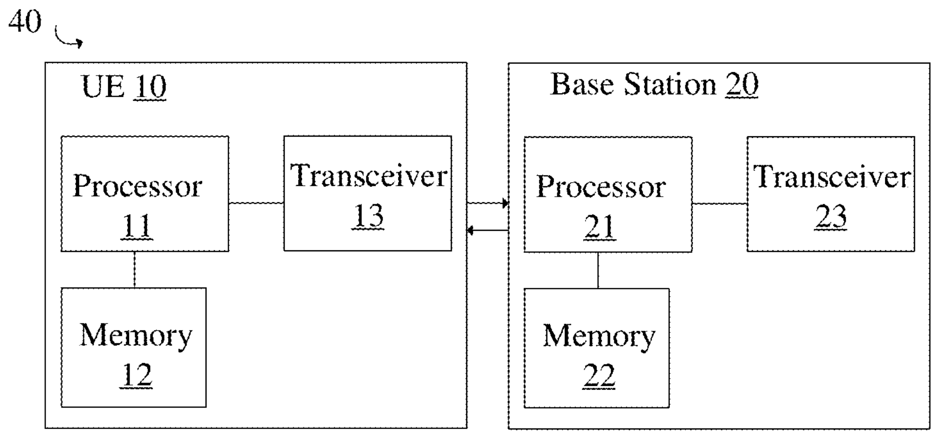
FIG. 2 is a block diagram of a user equipment (UE) and a base station of communication in a communication system according to an embodiment of the present disclosure.

FIG. 2 illustrates that, in some embodiments, a UE 10 and a base station 20 of communication in a communication system 40. The communication system 40 includes the UE 10 and the BS 20. The UE 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to obtain sensor data from a sensor coupled to a target object, perform a key generation with the base station 20, and obtain cryptographic information based on the key generation. The transceiver 13 is configured to receive a reflected-sensing signal from the target object, the processor 11 is configured to encrypt at least one of the sensor data and the reflected-sensing signal using the cryptographic information to generate an encrypted packet, and the transceiver 13 is configured to transmit the encrypted packet to the base station 20. This can solve issues in the prior art and other issues. Further, the proposed some embodiments can provide secure and efficient sensing.

In some embodiments, the processor 21 is configured to perform a key generation with the user equipment 10 and obtain cryptographic information based on the key generation. The transceiver 23 is configured to transmit a sensing signal to a target object associated with a sensor and receive an encrypted packet from the user equipment 10, wherein the encrypted packet includes at least one of sensor data and a reflected-sensing signal. This can solve issues in the prior art and other issues. Further, the proposed some embodiments can provide secure and efficient sensing.

Figure 3:
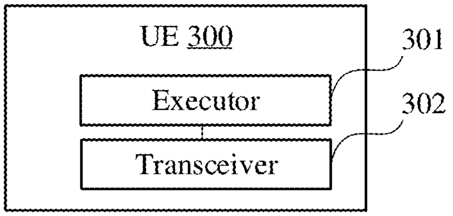
FIG. 3 is a block diagram of a UE according to an embodiment of the present disclosure.

FIG. 3 illustrates a UE 300 according to an embodiment of the present disclosure. The UE 300 is configured to implement some embodiments of the disclosure. Some embodiments of the disclosure may be implemented into the UE 300 using any suitably configured hardware and/or software. The UE 300 includes an executor 301 and a transceiver 302. The executor 301 is configured to obtain sensor data from a sensor coupled to a target object, perform a key generation with a base station, and obtain cryptographic information based on the key generation. The transceiver 302 is configured to receive a reflected-sensing signal from the target object, the executor 301 is configured to encrypt at least one of the sensor data and the reflected-sensing signal using the cryptographic information to generate an encrypted packet, and the transceiver 302 is configured to transmit the encrypted packet to the base station. This can solve issues in the prior art and other issues. Further, the proposed some embodiments can provide secure and efficient sensing.

Figure 4:
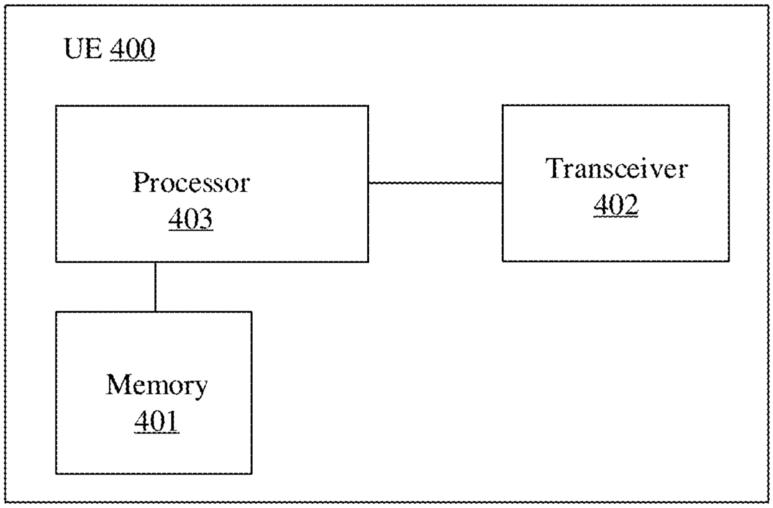
FIG. 4 is a block diagram of a UE according to an embodiment of the present disclosure.

FIG. 4 illustrates a UE 400 according to an embodiment of the present disclosure. The UE 400 is configured to implement some embodiments of the disclosure. Some embodiments of the disclosure may be implemented into the UE 400 using any suitably configured hardware and/or software. The UE 400 may include a memory 401, a transceiver 402, and a processor 403 coupled to the memory 401 and the transceiver 402. The processor 403 may be configured to implement proposed functions, procedures and/or methods described in this description. Layers of radio interface protocol may be implemented in the processor 403. The memory 401 is operatively coupled with the processor 403 and stores a variety of information to operate the processor 403. The transceiver 402 is operatively coupled with the processor 403, and the transceiver 402 transmits and/or receives a radio signal. The processor 403 may include application-specific integrated circuit (ASIC), other chipset, logic circuit and/or data processing device. The memory 401 may include read-only memory (ROM), random access memory (RAM), flash memory, memory card, storage medium and/or other storage device. The transceiver 402 may include baseband circuitry to process radio frequency signals. When the embodiments are implemented in software, the techniques described herein can be implemented with modules (e.g., procedures, functions, and so on) that perform the functions described herein. The modules can be stored in the memory 401 and executed by the processor 403. The memory 401 can be implemented within the processor 403 or external to the processor 403 in which case those can be communicatively coupled to the processor 403 via various means as is known in the art.

In some embodiments, the processor 403 is configured to obtain sensor data from a sensor coupled to a target object, perform a key generation with a base station, and obtain cryptographic information based on the key generation. The transceiver 402 is configured to receive a reflected-sensing signal from the target object, the processor 403 is configured to encrypt at least one of the sensor data and the reflected-sensing signal using the cryptographic information to generate an encrypted packet, and the transceiver 302 is configured to transmit the encrypted packet to the base station. This can solve issues in the prior art and other issues. Further, the proposed some embodiments can provide secure and efficient sensing.

Figure 5:
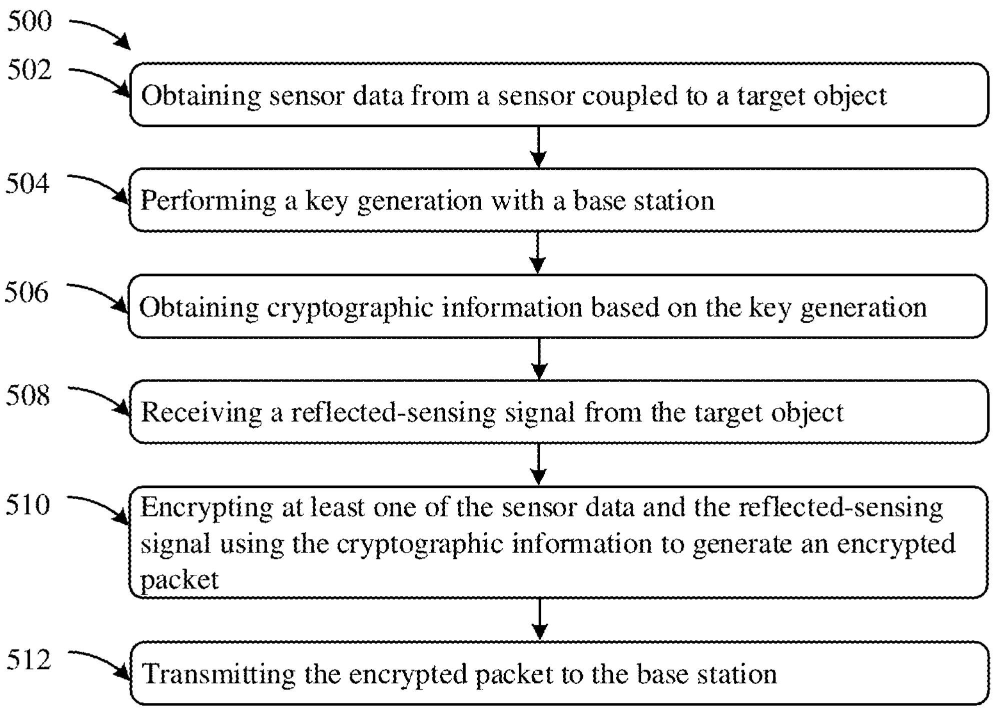
FIG. 5 is a flowchart illustrating a wireless communication method of key generation performed by a UE according to an embodiment of the present disclosure.

FIG. 5 illustrates a wireless communication method 500 of key generation performed by a UE according to an embodiment of the present disclosure. The wireless communication method 500 of key generation performed by the UE is configured to implement some embodiments of the disclosure. Some embodiments of the disclosure may be implemented into the wireless communication method 500 of key generation performed by the UE using any suitably configured hardware and/or software. In some embodiments, the wireless communication method 500 of key generation performed by the UE includes: an operation 502, obtaining sensor data from a sensor coupled to a target object, an operation 504, performing a key generation with a base station; an operation 506, obtaining cryptographic information based on the key generation, an operation 508, receiving a reflected-sensing signal from the target object, an operation 510, encrypting at least one of the sensor data and the reflected-sensing signal using the cryptographic information to generate an encrypted packet, and an operation 512, transmitting the encrypted packet to the base station. This can solve issues in the prior art and other issues. Further, the proposed some embodiments can provide secure and efficient sensing.

In some embodiments, the sensor includes a heartrate monitoring sensor, a breathing monitor sensor, or a body temperature sensor. In some embodiments, the key generation is a physical layer key generation. In some embodiments, the cryptographic information is used as a one-time pad (OTP) or a cipher key. In some embodiments, the wireless communication method further includes combining the reflected-sensing signal and the sensor data. In some embodiments, encrypting the at least one of the sensor data and the reflected-sensing signal using the cryptographic information to generate the encrypted packet includes encrypting a combination of the reflected-sensing signal and the sensor data using the cryptographic information to generate the encrypted packet, wherein the encrypted packet includes the combination of the reflected-sensing signal and the sensor data.

In some embodiments, the key generation is a higher layer key generation. In some embodiments, encrypting the at least one of the sensor data and the reflected-sensing signal using the cryptographic information to generate the encrypted packet includes encrypting the reflected-sensing signal using the cryptographic information to generate the encrypted packet, wherein the encrypted packet includes the reflected-sensing signal. In some embodiments, the wireless communication method further includes separately transmitting the sensor data and the encrypted packet to the base station.

Figure 6:
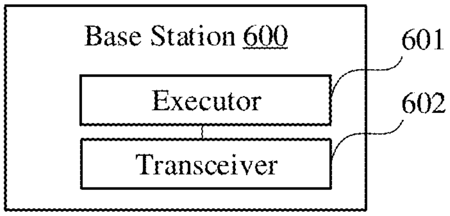
FIG. 6 is a block diagram of a base station according to an embodiment of the present disclosure.

FIG. 6 illustrates a base station 600 according to an embodiment of the present disclosure. The base station 600 is configured to implement some embodiments of the disclosure. Some embodiments of the disclosure may be implemented into the base station 600 using any suitably configured hardware and/or software. The base station 600 includes an executor 601 and a transceiver 602. The executor 601 is configured to perform a key generation with a user equipment and obtain cryptographic information based on the key generation. The transceiver 602 is configured to transmit a sensing signal to a target object associated with a sensor and receive an encrypted packet from a user equipment, wherein the encrypted packet includes at least one of sensor data and a reflected-sensing signal. This can solve issues in the prior art and other issues. Further, the proposed some embodiments can provide secure and efficient sensing.

Figure 7:
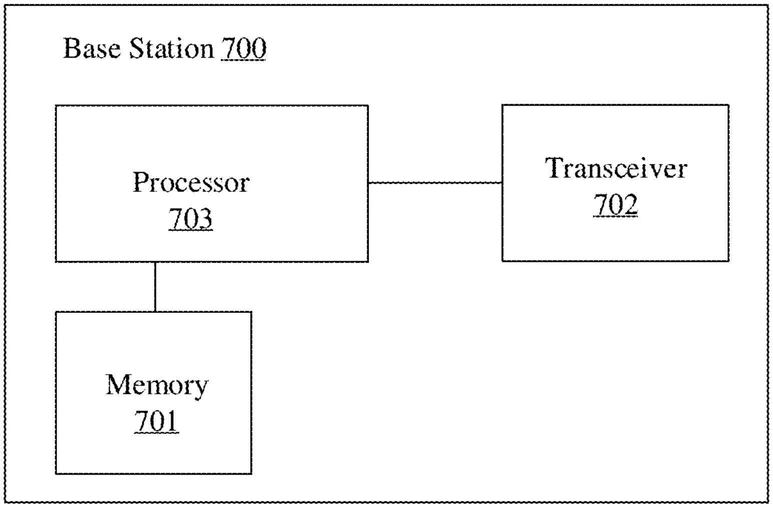
FIG. 7 is a block diagram of a base station according to an embodiment of the present disclosure.

FIG. 7 illustrates a base station 700 according to an embodiment of the present disclosure. The base station 700 is configured to implement some embodiments of the disclosure. Some embodiments of the disclosure may be implemented into the base station 700 using any suitably configured hardware and/or software. The base station 700 may include a memory 701, a transceiver 702, and a processor 703 coupled to the memory 701 and the transceiver 702. The processor 703 may be configured to implement proposed functions, procedures and/or methods described in this description. Layers of radio interface protocol may be implemented in the processor 703. The memory 701 is operatively coupled with the processor 703 and stores a variety of information to operate the processor 703. The transceiver 702 is operatively coupled with the processor 703, and the transceiver 702 transmits and/or receives a radio signal. The processor 703 may include application-specific integrated circuit (ASIC), other chipset, logic circuit and/or data processing device. The memory 701 may include read-only memory (ROM), random access memory (RAM), flash memory, memory card, storage medium and/or other storage device. The transceiver 702 may include baseband circuitry to process radio frequency signals. When the embodiments are implemented in software, the techniques described herein can be implemented with modules (e.g., procedures, functions, and so on) that perform the functions described herein. The modules can be stored in the memory 701 and executed by the processor 703. The memory 701 can be implemented within the processor 703 or external to the processor 703 in which case those can be communicatively coupled to the processor 703 via various means as is known in the art.

In some embodiments, the processor 703 is configured to perform a key generation with a user equipment and obtain cryptographic information based on the key generation. The transceiver 702 is configured to transmit a sensing signal to a target object associated with a sensor and receive an encrypted packet from a user equipment, wherein the encrypted packet includes at least one of sensor data and a reflected-sensing signal. This can solve issues in the prior art and other issues. Further, the proposed some embodiments can provide secure and efficient sensing.

Figure 8:
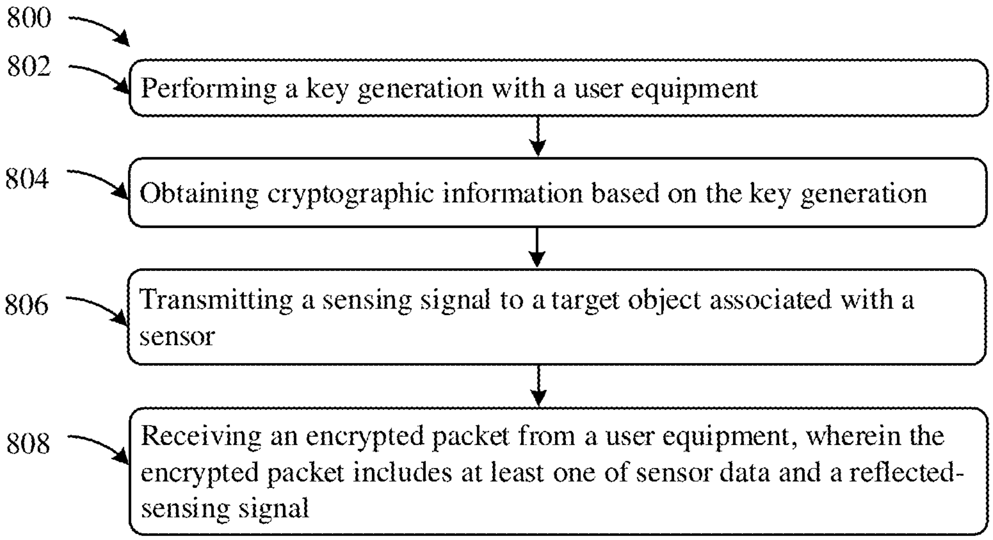
FIG. 8 is a flowchart illustrating a wireless communication method of key generation performed by a base station according to an embodiment of the present disclosure.

FIG. 8 illustrates a wireless communication method 800 of key generation performed by a base station according to an embodiment of the present disclosure. The wireless communication method 800 of key generation performed by the station is configured to implement some embodiments of the disclosure. Some embodiments of the disclosure may be implemented into the wireless communication method 800 of key generation performed by the base station using any suitably configured hardware and/or software. In some embodiments, the wireless communication method 800 of key generation performed by the base station includes: an operation 802, performing a key generation with a user equipment, an operation 804, obtaining cryptographic information based on the key generation, an operation 806, transmitting a sensing signal to a target object associated with a sensor, and an operation 808, receiving an encrypted packet from a user equipment, wherein the encrypted packet includes at least one of sensor data and a reflected-sensing signal. This can solve issues in the prior art and other issues. Further, the proposed some embodiments can provide secure and efficient sensing.

In some embodiments, the wireless communication method further includes processing the encrypted packet using the cryptographic information to obtain at least one of the sensor data and the reflected-sensing signal, wherein the sensor data is associated with the target object. In some embodiments, processing the encrypted packet using the cryptographic information to obtain the at least one of the sensor data and the reflected-sensing signal includes processing the encrypted packet using the cryptographic information to obtain a combination of the sensor data and the reflected-sensing signal. In some embodiments, the sensor includes a heartrate monitoring sensor, a breathing monitor sensor, or a body temperature sensor.

In some embodiments, the key generation is a physical layer key generation. In some embodiments, the cryptographic information is used as a one-time pad (OTP) or a cipher key. In some embodiments, the key generation is a higher layer key generation. In some embodiments, processing the encrypted packet using the cryptographic information to obtain the at least one of the sensor data and the reflected-sensing signal includes processing the encrypted packet using the cryptographic information to obtain the reflected-sensing signal. In some embodiments, the wireless communication method further includes separately receiving the sensor data and the encrypted packet from the base station.

Figure 9:
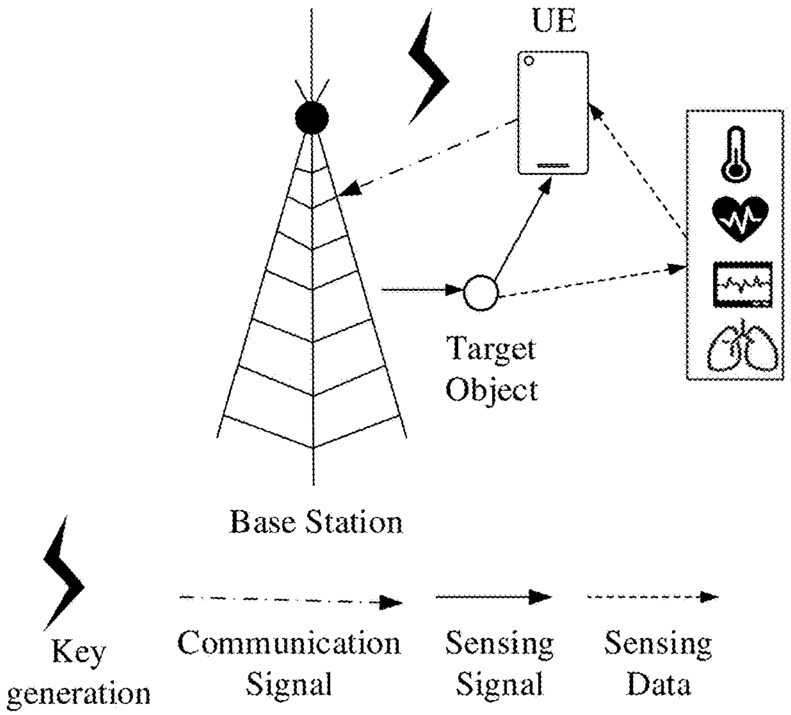
FIG. 9 is a block diagram of an example of secure sensing signal and sensor data transmission according to an embodiment of the present disclosure.

FIG. 9 is an example of secure sensing signal and sensor data transmission according to an embodiment of the present disclosure. FIG. 9 illustrates that, in some embodiments, 5G sensing uses 5G radio waves (or signals) transmitted to a target object being sensed that is not a UE. Then, the radio waves are reflected to a receiver similar to that of a LiDAR or a radar. Sensors that do not rely on 5G sensing signals (e.g., non-3GPP sensors) are attached to a sensing target object (that is not a UE) that collects and sends sensor data to the UE. The sensor data may be sent to the UE using, e.g., Bluetooth, near-field communication (NFC), or wireless local area network (WLAN) 802.11 wireless connections. Exchanges of radio waves and sensor data between a 3GPP transmitter and a 3GPP receiver (e.g., between a UE and a base station such as a gNB) can be used to establish shared key or a one-time pad (OTP). The shared key and/or one-time pad is used to protect the communication between the transmitter and the receiver.

During 5G sensing operations between a transmitter and a receiver (e.g., between a UE and a base station such as a gNB), sensor data collected by a UE from sensors attached to a target object being sensed is added or attached to sensing signal or sensing messages, the sensing signal or sensing messages are protected by the shared keys or one-time pad generated using physical layer generation techniques.

Figure 10:
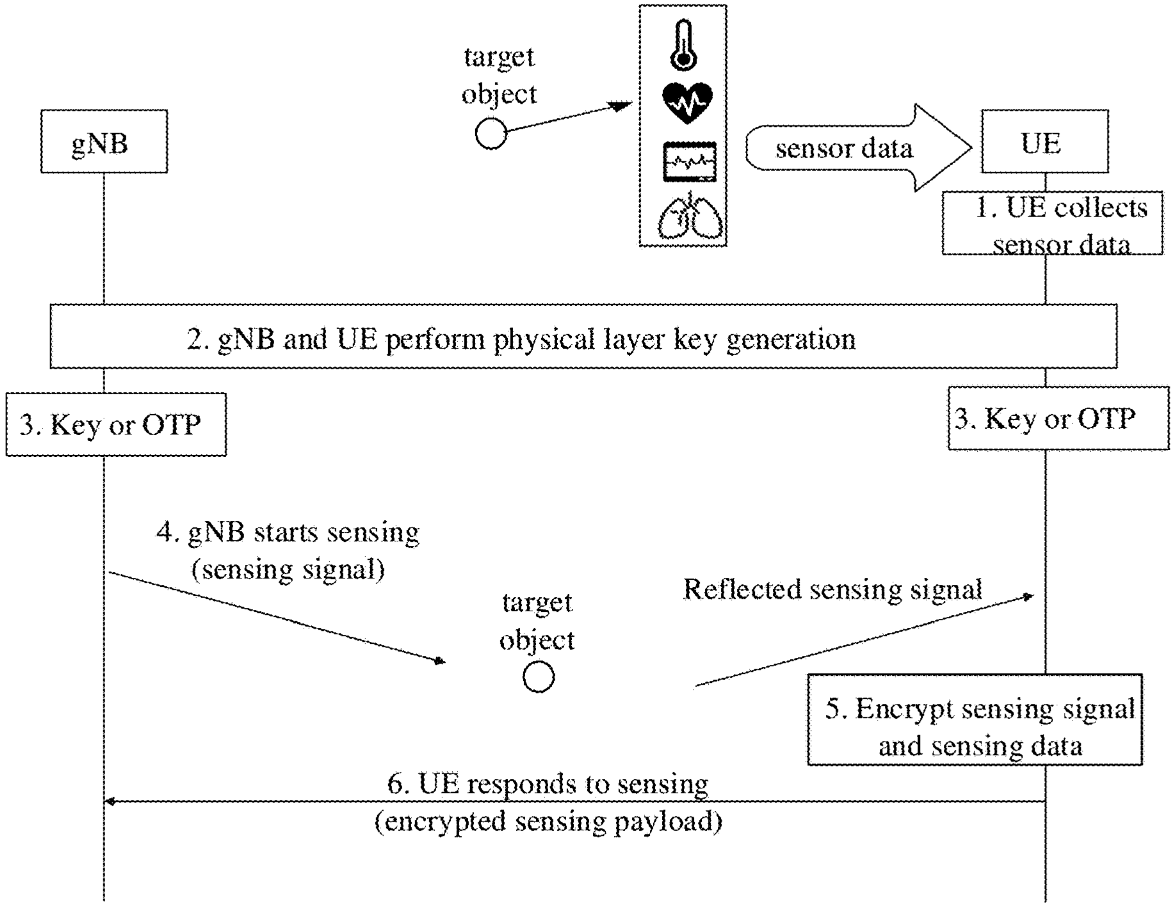
FIG. 10 is a flowchart illustrating an example of secure and efficient sensing according to an embodiment of the present disclosure.

FIG. 10 is an example of secure and efficient sensing according to an embodiment of the present disclosure. FIG. 9 illustrates that, in some embodiments, a UE and a base station such as a gNB are assumed to have been authorized to perform sensing operations on a target object (e.g., a patient).

Operation 1: The UE is configured to obtain sensor data from a sensor coupled to a target object. For examples, the sensor may be a non-3GPP sensor. The non-3GPP sensor may include a heartrate monitoring sensor, a breathing monitor sensor, or a body temperature sensor.

For example, non-3GPP sensors (e.g., heartrate monitoring sensor, breathing monitor sensor, body temperature sensor, etc.) are connected to the target object being monitored. Sensors and a UE are connected (e.g., via Bluetooth or WLAN). UE collects sensor data from the sensors. For example, the UE may collect sensor data using an application that allows the sensors to communicate with the UE. Sensor data collection may occur periodically or on-demand.

Operation 2: The UE is configured to perform a key generation with a base station. The key generation may be a physical layer key generation.

For example, gNB and UE initiate communication and physical layer key generation, e.g., by performing channel establishment by using, exchanging, or measuring various radio frequency (RF) parameters such as received signal strength (RSS), channel impulse response (CIR), channel state information (CSI), etc. Using wireless channel reciprocity characteristics between a gNB and a UE, a string of bits that are only known to the gNB and UE are generated. This may be accomplished using a number of physical layer key generation schemes.

Operation 3: The UE is configured to obtain cryptographic information based on the key generation. The cryptographic information may be used as a one-time pad (OTP) or a cipher key.

For example, this string of bits can then be used directly as a one-time pad (OTP) or indirectly as a cipher key. The string can also be used as input to generate a cipher key. At this point, both gNB and UE have the same cryptographic information (e.g., cryptographic material) that can be used to protect communication between them.

Operation 4: The UE is configured to receive a reflected-sensing signal from the target object.

For example, gNB initiates sensing operation with the target object by transmitting sensing signal toward the UE. Since the sensing signal transmitted toward the UE does not contain user privacy sensitive information, the signal may be sent unencrypted. However, the gNB selects to encrypt the signal data, it can also do so since the cryptographic material for protecting the communication between gNB and UE is already available in the previous operation (e.g., Operation 3). Sensing operations may involve gNB evaluating various parameters, e.g., such as the path loss, propagation delay (phase delay), and received signal strength, to understand the current radio environment and channel conditions between the gNB and the UE. The sensing signal is reflected on the target object and received by the UE. The reflected signal from the gNB is sometimes called "sensing measurement data."

Operation 5: The UE is configured to encrypt at least one of the sensor data and the reflected-sensing signal using the cryptographic information to generate an encrypted packet. In some examples, the UE is configured to encrypt a combination of the reflected-sensing signal and the sensor data using the cryptographic information to generate the encrypted packet, wherein the encrypted packet includes the combination of the reflected-sensing signal and the sensor data. In some examples, the UE is configured to combine the reflected-sensing signal and the sensor data.

For example, the UE combines the reflected sensing signal from the gNB and the sensor data collected by the UE from sensors that are attached to the target object. Using the key made available from Operation 3, the UE encrypts the combined sensing signal and sensor data. Encryption of sensing signal and sensor data may be achieved using a cipher algorithm such as advanced encryption standard (AES) or exclusive-or (XOR) operation on the data in case one-time pad encryption is used.

Operation 6: the UE is configured to transmit the encrypted packet to the base station.

For example, the UE responds to the gNB sensing operation by including an encrypted payload. The encrypted payload ensures that the sensing signal and the sensor data are protected against various attacks such as eavesdropping and thus ensuring the privacy of the target object.

In some embodiments, there some operations are disclosed. Operation 1: The UE is configured to obtain sensor data from a sensor coupled to a target object. For examples, the sensor may be a non-3GPP sensor. The non-3GPP sensor may include a heartrate monitoring sensor, a breathing monitor sensor, or a body temperature sensor. Operation 2: The UE is configured to perform a key generation with a base station. The key generation may be a higher layer key generation. Operation 3: The UE is configured to obtain cryptographic information based on the key generation. The cryptographic information may be used as a one-time pad (OTP) or a cipher key. Operation 4: The UE is configured to receive a reflected-sensing signal from the target object. Operation 5: The UE is configured to encrypt at least one of the sensor data and the reflected-sensing signal using the cryptographic information to generate an encrypted packet. In some examples, the UE is configured to encrypt the reflected-sensing signal using the cryptographic information to generate the encrypted packet, wherein the encrypted packet includes the reflected-sensing signal. Operation 6: the UE is configured to transmit the encrypted packet to the base station. In some examples, the UE is configured to separately transmit the sensor data and the encrypted packet to the base station For example, one alternative to proposed solution uses a higher layer key exchange protocol to establish shared key between the gNB and the UE. After the key exchange, the shared key can be used to protect the communication (e.g., exchange of sensing signal) between the gNB and the UE. Additionally, any sensor data collected by the UE from sensors available or attached to the sensed target-object may be sent to the 5G network separately using additional exchange of messages between the UE and the gNB.

Secure and efficient sensing provides at least one of following sensing-operation benefits. 1. It improves the system security by providing a secure mechanism by which to protect the sensing signal and the sensor data. Exposing or not protecting the sensing signal and the sensor data can lead to the leakage of privacy information of the target object. For example, if the target object is a patient monitoring device used during a medical operation or procedure, leakage of sensor data can reveal the condition of the patient to unauthorized personnel. This can be a direct violation of many privacy regulations, such as general data protection regulation defined by European Union. 2. Sensing operations alone may not provide the desired granularity or accuracy required in some scenarios. Using additionally available sensors that do not use 5G signal for sensing can improve the accuracy of the 5G sensing result. 3. By combining the sensing signal and sensor data collected by the UE into the same sensing operation between the gNB and UE, it reduces the number of signaling or data exchanges between the gNB and the UE, if the sensor data is sent using a separate and dedicated communication. 4. Using PHY layer key-generation mechanisms also reduces the number of rounds of upper layer signal exchanges to establish a shared key between the gNB and UE. This is advantageous, especially when the UE is implemented as a constrained device, e.g., such as a low-power device UE (e.g., internet-of-things (IoT), industrial IoT (IIoT), etc.) or a reduced-capacity (e.g., RedCap) UE.

Commercial interests for some embodiments are as follows. 1. Solve issues in the prior art. 2. Solve other issues. 3. Provide secure and efficient sensing. 4. Provide a good communication performance. 5. Provide high reliability. 6. Some embodiments of the present disclosure are used by chipset vendors, video system development vendors, automakers including cars, trains, trucks, buses, bicycles, motobikes, helmets, and etc., drones (unmanned aerial vehicles), smartphone makers, communication devices for public safety use, AR/VR/MR device maker for example gaming, conference/seminar, education purposes. Some embodiments of the present disclosure are a combination of "techniques/processes" that can be adopted in video standards to create an end product. Some embodiments of the present disclosure propose technical mechanisms. The at least one proposed solution, method, system, and apparatus of some embodiments of the present disclosure may be used for current and/or new/future standards regarding communication systems such as an AIoT device, a node (UE/BS), and/or a communication system. Compatible products follow at least one proposed solution, method, system, and apparatus of some embodiments of the present disclosure. The proposed solution, method, system, and apparatus are widely used in an AIoT device, a node (UE/BS), and/or a communication system. With the implementation of the at least one proposed solution, method, system, and apparatus of some embodiments of the present disclosure, at least one modification to communication methods and apparatus are considered for standardizing.

Figure 11:
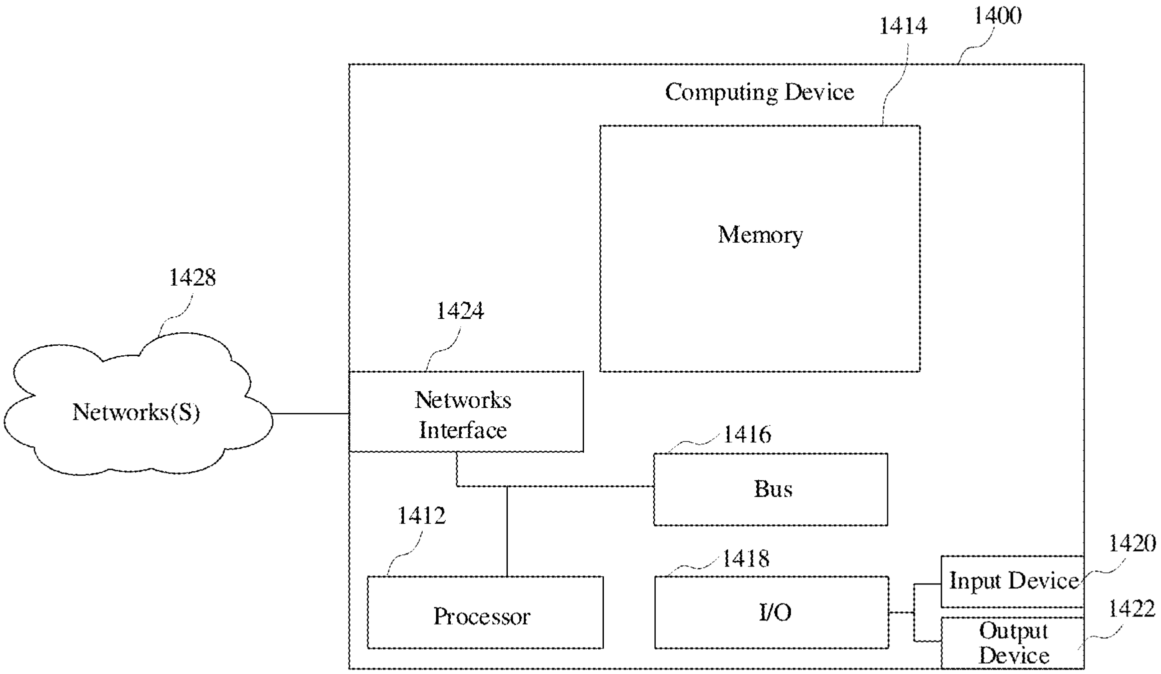
FIG. 11 is a block diagram of an example of a computing device according to an embodiment of the present disclosure.

FIG. 11 is an example of a computing device 1400 according to an embodiment of the present disclosure. Any suitable computing device can be used for performing the operations described herein. For example, FIG. 11 illustrates an example of the computing device 1400 that can implement apparatuses and methods of the above embodiments of FIGS. 1 to 10, using any suitably configured hardware and/or software. In some embodiments, the computing device 1400 can include a processor 1412 that is communicatively coupled to a memory 1414 and that executes computer-executable program code and/or accesses information stored in the memory 1414. The processor 1412 may include a microprocessor, an application-specific integrated circuit ("ASIC"), a state machine, or other processing device. The processor 1412 can include any of a number of processing devices, including one. Such a processor can include or may be in communication with a computer-readable medium storing instructions that, when executed by the processor 1412, cause the processor to perform the operations described herein.

The memory 1414 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, a memory chip, a read-only memory (ROM), a random access memory (RAM), an application specific integrated circuit (ASIC), a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, visual basic, java, python, perl, javascript, and actionscript.

The computing device 1400 can also include a bus 1416. The bus 1416 can communicatively couple one or more components of the computing device 1400. The computing device 1400 can also include a number of external or internal devices such as input or output devices. For example, the computing device 1400 is illustrated with an input/output ("I/O") interface 1418 that can receive input from one or more input devices 1420 or provide output to one or more output devices 1422. The one or more input devices 1420 and one or more output devices 1422 can be communicatively coupled to the I/O interface 1418. The communicative coupling can be implemented via any suitable manner (e.g., a connection via a printed circuit board, connection via a cable, communication via wireless transmissions, etc.). Non-limiting examples of input devices 1420 include a touch screen (e g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 1422 include a liquid crystal display (LCD) screen, an external monitor, a speaker, or any other device that can be used to display or otherwise present outputs generated by a computing device.

The computing device 1400 can execute program code that configures the processor 1412 to perform one or more of the operations described above with respect to methods of the above embodiments of FIGS. 1 to 10. The program code may be resident in the memory 1414 or any suitable computer-readable medium and may be executed by the processor 1412 or any other suitable processor.

The computing device 1400 can also include at least one network interface device 1424. The network interface device 1424 can include any device or group of devices suitable for establishing a wired or wireless data connection to one or more data networks 1428. Non limiting examples of the network interface device 1424 include an Ethernet network adapter, a modem, and/or the like. The computing device 1400 can transmit messages as electronic or optical signals via the network interface device 1424.

Figure 12:
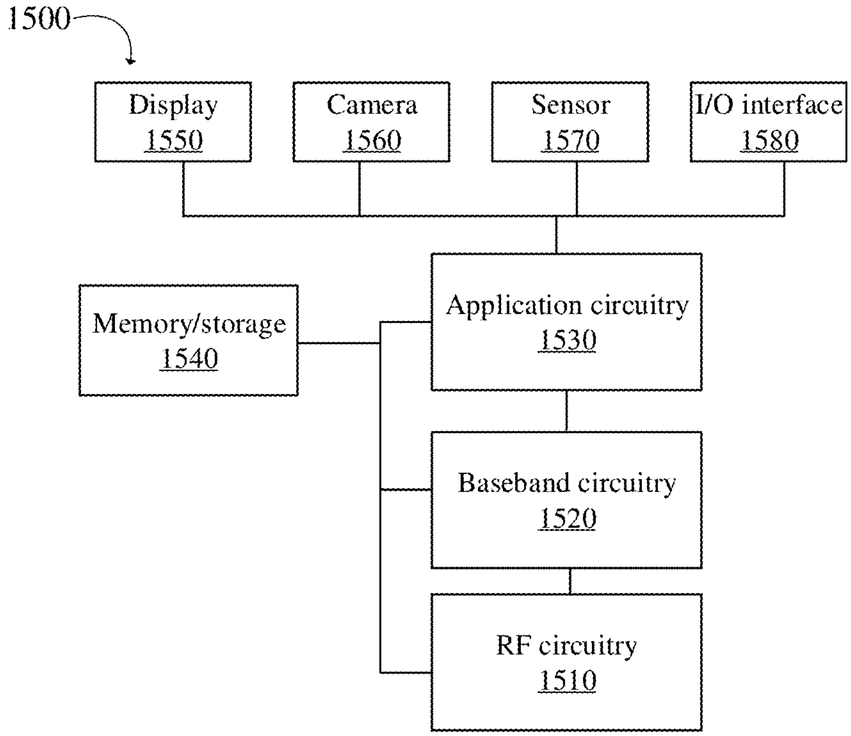
FIG. 12 is a block diagram of a communication system according to an embodiment of the present disclosure.

FIG. 12 is a block diagram of an example of a communication system 1500 according to an embodiment of the present disclosure. Embodiments described herein may be implemented into the communication system 1500 using any suitably configured hardware and/or software. FIG. 12 illustrates the communication system 1500 including a radio frequency (RF) circuitry 1510, a baseband circuitry 1520, an application circuitry 1530, a memory/storage 1540, a display 1550, a camera 1560, a sensor 1570, and an input/output (I/O) interface 1580, coupled with each other at least as illustrated.

The application circuitry 1530 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system. The communication system 1500 can execute program code that configures the application circuitry 1530 to perform one or more of the operations described above with respect to methods of the above embodiments of FIGS. 1 to 10. The program code may be resident in the application circuitry 1530 or any suitable computer-readable medium and may be executed by the application circuitry 1530 or any other suitable processor.

The baseband circuitry 1520 may include circuitry such as, but not limited to, one or more single-core or multi-core processors. The processors may include a baseband processor. The baseband circuitry may handle various radio control functions that may enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 1520 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 1510 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 1510 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to apparatuses and methods of the above embodiments of FIGS. 1 to 10 may be embodied in whole or in part in one or more of the RF circuitry, the baseband circuitry, and/or the application circuitry. As used herein, "circuitry" may refer to, be part of, or include an application specific integrated circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 1540 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 1580 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 1570 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 1550 may include a display, such as a liquid crystal display and a touch screen display. In various embodiments, the communication system 1500 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method of key generation by a user equipment, comprising:

obtaining sensor data from a non-3GPP sensor coupled to a target object, wherein the sensor data comprises medical information about the target object;

performing a physical layer key generation with a base station;

obtaining cryptographic information based on the key generation;

receiving a 5G reflected-sensing signal from the target object;

encrypting the sensor data and the reflected-sensing signal using the cryptographic information to generate an encrypted packet; and transmitting the encrypted packet to the base station;

wherein the wireless communication method further comprises combining the reflected-sensing signal and the sensor data;

wherein encrypting the sensor data and the reflected-sensing signal using the cryptographic information to generate the encrypted packet comprises:

encrypting a combination of the reflected-sensing signal and the sensor data using the cryptographic information to generate the encrypted packet, wherein the encrypted packet comprises the combination of the reflected-sensing signal and the sensor data.

2. The wireless communication method of claim 1, wherein the non-3GPP sensor comprises a heartrate monitoring sensor, a breathing monitor sensor, or a body temperature sensor.

3. The wireless communication method of claim 1, wherein the cryptographic information is used as a one-time pad (OTP) or a cipher key.

4. A wireless communication method of key generation by a base station, comprising:

performing a physical layer key generation with a user equipment that has obtained sensor data from a non-3GPP sensor coupled to a target object, wherein the sensor data comprises medical information about the target object;

obtaining cryptographic information based on the physical layer key generation;

transmitting a 5G reflected-sensing signal to the target object; and receiving an encrypted packet from a user equipment, wherein the encrypted packet comprises the sensor data and the reflected-sensing signal, wherein the sensor data and reflected-sensing signal are combined and encrypted together using the cryptographic information;

wherein the wireless communication method further comprises: processing the encrypted packet using the cryptographic information to obtain a combination of the sensor data and the reflected-sensing signal.

5. The wireless communication method of claim 4, wherein the non-3GPP sensor comprises a heartrate monitoring sensor, a breathing monitor sensor, or a body temperature sensor.

6. The wireless communication method of claim 4, wherein the cryptographic information is used as a one-time pad (OTP) or a cipher key.

7. A user equipment, comprising:

a memory;

a transceiver; and a processor coupled to the memory and the transceiver;

wherein the user equipment is configured to perform:

obtaining sensor data from a non-3GPP sensor coupled to a target object, wherein the sensor data comprises medical information about the target object:

performing a physical layer key generation with a base station;

obtaining cryptographic information based on the key generation;

receiving a 5G reflected-sensing signal from the target object;

combining the reflected-sensing signal and the sensor data;

encrypting the sensor data and the reflected-sensing signal using the cryptographic information to generate an encrypted packet; and transmitting the encrypted packet to the base station;

wherein encrypting the sensor data and the reflected-sensing signal using the cryptographic information to generate the encrypted packet comprises:

encrypting a combination of the reflected-sensing signal and the sensor data using the cryptographic information to generate the encrypted packet, wherein the encrypted packet comprises the combination of the reflected-sensing signal and the sensor data.

8. The user equipment of 7, wherein the cryptographic information is used as a one-time pad (OTP) or a cipher key.

* * * * *